May 27, 1947.  R. H. HIGBY  2,421,061
METHODS FOR RECOVERY OF FLAVANONE GLYCOSIDES
Filed March 11, 1944

1 | FLAVANONE GLYCOSIDE SOURCE MATERIAL | — PLANT MATERIAL AS CITRUS PULP

2 | FIRM OR HARDEN | — AS WITH LIME

3 | ALKALINE EXTRACTION | — AS WITH NaOH OR NH₄OH

4 | LIQUOR REMOVAL | — AS BY PRESSING

5 | LOWER pH OF LIQUOR | — AS WITH HCl

6 | CRYSTALLIZATION

7 | SEPARATION OF CRYSTALS

8 | RECRYSTALLIZATION | — IF DESIRED

INVENTOR
RALPH H. HIGBY

ATTORNEY

Patented May 27, 1947

2,421,061

UNITED STATES PATENT OFFICE 2,421,061

METHODS FOR RECOVERY OF FLAVANONE GLYCOSIDES

Ralph H. Higby, Ontario, Calif., assignor to California Fruit Growers Exchange, Los Angeles, Calif., a corporation of California Application March 11, 1944, Serial No. 526,087

4 Claims. (Cl. 260—210)

This invention relates to a new and useful process for the recovery of flavanone glycosides from plant source material.

An object of this invention is the recovery of flavanone glycosides from their source materials, e. g., citrus fruits. It involves alkaline extraction of the flavanone glycosides from their source materials.

These and further objects and advantages will appear more fully to those skilled in the art from a consideration of the invention as set forth in the following description and in the appended claims.

The drawing is a flow sheet containing an illustrative showing of my preferred process.

Convenient sources of certain of the commercially useful flavanone glycosides are the wastes accumulating in those establishments which are engaged in assembling and processing citrus fruits to recover other valuables, such as essential oil, pectin, citric acid, and many of the numerous types of juice products. The two most commonly identified flavanone glycosides occur in citrus. They are hesperidin and naringin. Eriodictin (also referred to in the literature as eriodictyol glycoside or "glucoside") has also been reported as occurring in citrus. A number of other flavanone glycosides have been identified, among which may be mentioned sakuranin, liquiritin, citronin, and neohesperidin.

My process will be illustrated as applied to the extraction of flavanone glycosides from citrus, and particularly from the fruit portion thereof.

The fruits are first preferably treated to remove the juice therefrom, or the juice portion of the fruit may be removed or separated from the peel in its entirety. The juice may be removed by reaming from the fruit or passing the whole fruit through a pulping machine or a suitable press. In some commercial processes for the canning of grapefruit hearts or sections, the peel is removed by hand from the juice ball.

If the peel is separated in large pieces from the juice portion, the peel should now preferably be disintegrated to such an extent as to be of uniformly small particle size so as to permit convenient access by the reagent. I have found that if the peel is passed through a press of the food chopper variety in which the face plate has openings of about 3/8 inch in diameter, the peel particles will be satisfactory for my purpose. It should be understood that as much of the rag and interior pulp as may be desired may be included with the peel in my flavanone glycoside recovery process. The particular manner in which the peel and pulp is comminuted is of significant importance only insofar as it may affect the access of reagents to the pulp and the ease with which the mass is handled through various types of equipment.

This produces a representative source material, indicated at 1 on the drawing. The pulp is then mixed with a sufficient amount of calcium hydroxide to cause a hardening, indicated at 2. Since a portion of the calcium hydroxide will be neutralized by any acid present, the particular amounts of calcium hydroxide to be added will vary, depending upon the acidity of the mass being treated. Where the preliminary process has been such as to include in this pulp a fair amount of the natural acid of the fruit, as in a bulk or mechanical juicing operation, and particularly in those cases in which there is a moderately large proportion of natural acid in the fruit, as in the case of grapefruit or some of the more acidic oranges, I find that the amount of lime added at this point may suitably run as high as fifteen pounds per ton in order to alkalinize the pulp sufficiently to give the best hardening. Where the peel has been separated with little or no admixture of juice, and in those cases where the fruit is naturally very low in acid, amounts as low as five or six pounds per ton will produce suitable hardening. Intimate mixing of the lime with the peel will promote more rapid hardening.

In carrying out step 2 of the process, I have found it desirable to use a tank of suitable capacity, as for example 500 gallons and one equipped with an agitator. In this tank are placed approximately 200 gallons of water to which I add about 10 pounds of slaked lime. This is sufficient water to suspend approximately one ton of the chopped pulp, which is agitated therein for approximately 15 minutes, after which there is added, as indicated at 3, a 25% caustic soda solution until the pH value of the liquor, when in equilibrium with the peel, remains definitely alkaline. The preferred extraction range will vary somewhat from member to member of the group. One well-known member of the group namely, naringin, will be extracted to some extent at the very low alkalinity of pH 7.5, and exhibits a preferred extraction range under commercial operating conditions of about pH 8.4 to about pH 9.1; while another member of the group, which from its structural formula appears to be very much like naringin, namely, hesperidin, can be extracted satisfactorily at the very much higher alkalinity of pH 11.5, and seems to exhibit a preferred extraction range under commercial operating conditions of about pH 10.8 to about pH 11.4. This suspension or slurry is preferably agitated for a further period of time, usually about 30 minutes, in order to give the best extraction and is then subjected to a pressing operation, indicated at 4, for the purpose of separating the liquor containing the flavanone glycoside from the pulp.

The liquor should be adjusted to within a range of about pH 4 to about pH 5, which I find gives good crystallization or precipitation with the members of the group generally. Some variation among the members with respect to crystallization is also found. Referring again specifically to hesperidin and naringin, hesperidin will be found to begin to crystallize slowly when pH 9 is reached and to crystallize at a commercially satisfactory rate at pH 6, while naringin will begin to crystallize at about pH 7 and increases to a moderately satisfactory rate at about pH 6. This acidification is conveniently and economically effected with hydrochloric acid, and is indicated at 5.

After adjustment of the pH, the flavanone glycoside is allowed to crystallize from the liquor. The crystallization step is indicated generally at 6. The flavanone glycoside separation step may be carried out in any desired and known manner, and is indicated on the flow sheet at 7. If it is desired to improve the purity of this product, purification may be effected by subsequent re-crystallization steps, which are all well known, and are indicated at 8.

Hesperidin has the empirical formula $C_{28}H_{34}O_{15}$ and can now with little or no doubt be assigned the following structural formula:

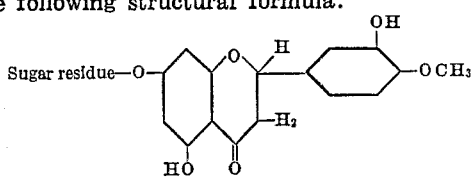

In this formula the sugar residue contains one molecule of rhamnose and one molecule of glucose. Hesperidin is a natural glycoside apparently occurring in most citrus fruits. While perhaps the most prolific source of hesperidin is the albedo of the citrus fruit, some has been found in the juice portion of the fruit, and traces have also been found in the leaves, twigs, and bark of citrus trees. This flavanone glycoside has been reported as occurring rather widely in nature. However, the definite possibility exists that the identification was not sufficiently certain in all cases and that in some of these instances, at least, other but closely related substances were reported as hesperidin.

Naringin is a natural glycoside having the empirical formula $C_{27}H_{32}O_{14}$ and apparently having the structural formula:

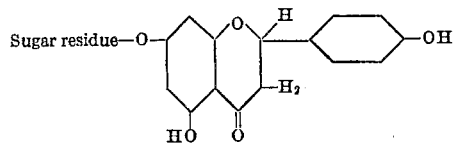

It apparently differs from hesperidin only in the absence of the methoxyl group at the 4' position and the shift of the hydroxyl group to this position. One of the most prolific sources is the peel and rag of the grapefruit. It is also reported to occur in relatively large quantities in the leaves. This glycoside seems so far only to have been reported as obtained from the grapefruit, which is variously identified as *Citrus grandis,* Osbeck, and *Citrus decumana,* Linn. (The Standard Cyclopedia of Horticulture, by L. H. Bailey, The Macmillan Company, 1935) and identified as derived from *Citrus maxima* (Webster's New International Dictionary, second edition). One recent worker has reported naringin as appearing in Indian shaddock, which is apparently a clearly distinguished variety of *Citrus maxima* (Webster's New International Dictionary, second edition).

Eriodictin (also referred to as eriodictyol glycoside), which is so far only reported as occurring in lemon peel, appears not to have been definitely identified as to structure but may be presumed to have the empirical formula $C_{27}H_{32}O_{15}$ and the structural formula:

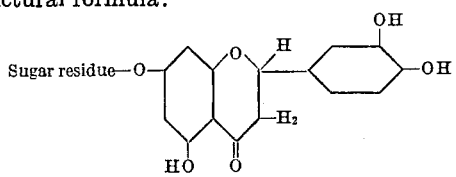

Eriodictin according to this view, is theoretically capable of being formed by the demethylation of hesperidin.

Sakuranin, having the empirical formula $C_{22}H_{24}O_{10}$, and the probable structural formula:

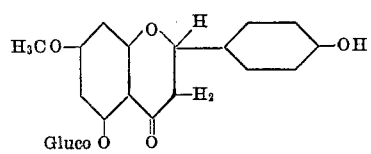

has been isolated from the bark of the *Prunus yedoensis* Matsumura.

Liquiritin, with the empirical formula $C_{21}H_{22}O_9$, and the apparent structural formula:

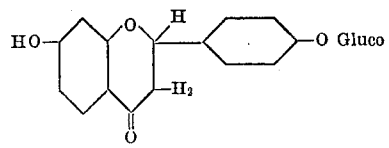

is obtained from the root of the licorice, *Glycyrrhiza glabra* L. var. *glandulifera.*

Citronin, with the empirical formula $C_{28}H_{34}O_{14}$, and the probable structural formula:

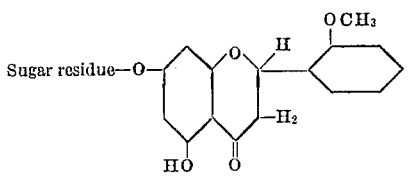

in which the sugar residue is apparently a rhamno-glucoside, as in hesperidin, and in which there is some question as to whether the methoxyl group, —OCH₃, is in the 2' or the 3' position, is obtained from the peel of lemon ponderosa, *Citrus limon.* Burm. f. *ponderosa* Hort.

Neohesperidin, isolated from bitter oranges, apparently has the same empirical formula as hesperidin, $C_{28}H_{34}O_{15}$, having also an identical aglycon and the same sugar groups united thereto, but appearing to have these bound differently, the substance possibly having the following structural formula:

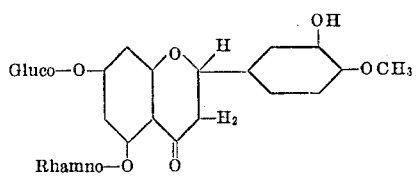

It is thus seen that the principal commercial sources of the flavanone glycosides are citrus fruits. My method is admirably adapted to extraction from these, and can be applied to the other sources. While in the above description I have in general referred to different species of citrus as sources of individual flavanone glycosides, it is known that more than one of these compounds occur in particular fruits; and it is to be expected, as identifications of individual members of this group of compounds becomes more certain, that more instances will become definitely known of the occurrence of more than one member of the group in individual species of citrus. Where two or more members do occur together, they probably are in my process precipitated together as complexes. When this occurs, it seems likely that at least one of the flavanone glycosides will be precipitated in the chalcone form.

Several methods have been heretofore known for the extraction of flavanone glycosides from their source materials. One almost universally reported in the literature depends upon the solubility of the flavanone glycosides in some organic solvent. While this method is satisfactory for laboratory procedures, it is ordinarily found prohibitively expensive for use in commercial operating conditions. Another method which can be used with those members of the group which have considerably greater solubility in hot water than in cold, consists essentially of boiling up the source material with water, followed by straining and cooling. Manifestly this method is capable of introducing considerable quantities of impurities with the recovered products, and indeed the other method mentioned immediately above will also introduce various impurities which may be soluble in the particular solvent employed, unless special precautionary steps are taken to prevent this result, which will naturally further increase the cost of the operation.

My method, in contradistinction, is very economical to operate and produces a very satisfactory yield commercially and a product which is relatively free of impurities.

I prefer, as an ordinary commercial embodiment, to use lime, i. e., calcium hydroxide, for the hardening step, for reasons of convenience and economy. But it should be noted that any alkaline earth compound which will give sufficient cations in the aqueous medium will function to harden the pulp satisfactorily. Barium hydroxide and strontium hydroxide are chemically effective. Whether they will desirably be utilized will depend upon the subsequent use, if any, to which it is intended to put the residual pulp.

While magnesium acts in some respects as an alkaline earth, it has been forcefully argued that it should not be considered as belonging to the alkaline earth group. Notwithstanding, I have found that, for example, $Mg(OH)_2$ or $MgCO_3$ may first be used to harden the peel, and the solubilization and extraction of the flavanone glycoside may then be effected by adding any appropriate alkaline reagent to obtain the desired pH of extraction. It therefore follows that for the purpose of this process, magnesium may be considered as an alkaline earth at the hardening step, but it is not preferred for use in the extraction step. While it is possible with $Mg(OH)_2$ to alkalinize into the lower portion of the operative extraction range, uneconomical quantities of reagent are required.

In step 3 of the above description, as an example, I have given the use of caustic soda for the purpose of adjusting the pH to a suitable range in accordance with the disclosures above to effect the desired pH of extraction. However it is to be understood that any alkali-acting substance which is capable of effecting the desired pH and which will solubilize the flavanone glycoside, i. e., form soluble compounds of the flavanone glycoside, may be used for this purpose. Examples of commercially convenient substances are potassium hydroxide, ammonium hydroxide, sodium carbonate, calcium hydroxide, etc. While these alkali-acting substances form compounds with flavanone glycosides which are often referred to as salts, they are more precisely called phenolates.

I have found that ammonium hydroxide is very convenient for use in the extraction since after the extraction has taken place, the alkalinity of the material may be reduced by merely subjecting the solution to aeration or to reduced pressure to remove ammonia. This variation of the process is not only convenient to employ, but is also economical in that considerably less acid is required for the subsequent neutralization which effects the precipitation of the flavanone glycoside.

Performance of the extraction step with alkali-acting substances which form soluble pectic compounds without having first performed the firming or hardening step hinders crystallization and will result in the recovery of pectic material with the crude flavanone glycoside.

While I have mentioned hydrochloric acid as being satisfactory for use in adjusting the pH of the liquor to within the range of about pH 4 to about pH 5 for purposes of crystallization, many mineral or organic acids may be used for this adjustment, for example, sulphuric acid, nitric acid, citric acid, acetic acid, carbonic acid, etc. Where the extraction, at step 3, has been performed with such a reagent or under such conditions that there is present in the liquor removed, at step 4, any appreciable quantity of alkaline earth, the acidifying step 5, will ordinarily be performed with acid which will yield a soluble alkaline earth salt, so as not to cause at this stage an alkaline earth precipitate which would introduce a filtration step or a recrystallization step into the procedure. Where ammonia has been used as the extraction agent, heat or aeration will go far towards completing the lowering of the pH of the liquor, indicated at 5.

While the desired pH range for crystallization has been indicated as lying within the range of about pH 4 to about pH 5, the variation among members of the group referred to above will necessarily be borne in mind. This acidification should not, of course, be carried on to such a point as to cause destruction or breakdown of the flavanone glycoside, and for this purpose I prefer not to go below about pH 2.5.

Furthermore, in the above examples, I have mentioned the use of only one extraction of the source material. It is obvious, however, that repeated extractions may be carried out on the source material in a manner well known to those skilled in the art. Furthermore I have found that additional amounts of flavanone glycoside may be recovered by washing the extracted source material with water after the first extraction and then using this wash water to make up subsequent batches of fresh peel for extraction purposes.

Having thus described my invention in such full, clear, concise, and exact language as to enable others skilled in the art to make and use the same, I claim as my invention and desire to secure by Letters Patent the following:

1. A method for the recovery of flavanone glycosides which comprises the steps of adding to plant material containing flavanone glycosides lime in amount sufficient to coagulate slimy components of the plant material and adjusting the alkalinity of an aqueous suspension of said plant material to a point sufficiently alkaline to result in the formation of soluble compounds of flavanone glycosides, allowing the mixture to stand for a time sufficient to solubilize and extract flavanone glycoside, recovering a liquor containing solubilized flavanone glycoside from said material, adjusting the pH of the liquor downward to promote crystallization of flavanone glycoside, allowing the flavanone glycoside to crystallize from the liquor and recovering crystallized flavanone glycoside therefrom.

2. A method of recovering flavanone glycosides from naturally occurring source materials, which comprises treating the source materials to harden slimy components thereof, alkalinizing an aqueous suspension of the material to above pH 7.5 to solubilize the flavanone glycoside, removing from the material liquor containing solubilized flavanone glycoside, acidifying the liquor to below pH6 to precipitate the flavanone glycoside, and removing the precipitated material from the solution.

3. A method of recovering naturally occurring flavanone glycoside from plant materials, which comprises treating the plant material with water and sufficient of an alkali compound to adjust the pH of the mixture to above 7.5 to solubilize the flavanone glycoside, removing liquor containing the solubilized flavanone glycoside, acidifying the liquor to below pH6 to precipitate the flavanone glycoside and separating the precipitated material from the liquor.

4. A method of recovering naturally occurring flavanone glycoside from plant materials, which comprises treating the plant material with water and sufficient of an alkaline ammonia compound to adjust the pH of the mixture to above 7.5 to solubilize the flavanone glycoside, removing liquor containing the solubilized flavanone glycoside, reducing the pH of the liquor to below pH6 to precipitate the flavanone glycoside, and separating the precipitated material from the liquor.

RALPH H. HIGBY.

REFERENCES CITED

The following references are of record in the file of this patent:

UNITED STATES PATENTS

| Number | Name | Date |
|---|---|---|
| 2,348,215 | Higby | May 9, 1944 |